Jan. 7, 1947.  E. P. MUNTZ  2,413,990
PROCESS OF MAKING PRESTRESSED REINFORCED CONCRETE
Filed Jan. 25, 1943  7 Sheets-Sheet 1
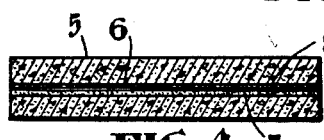
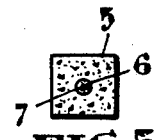
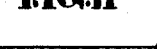
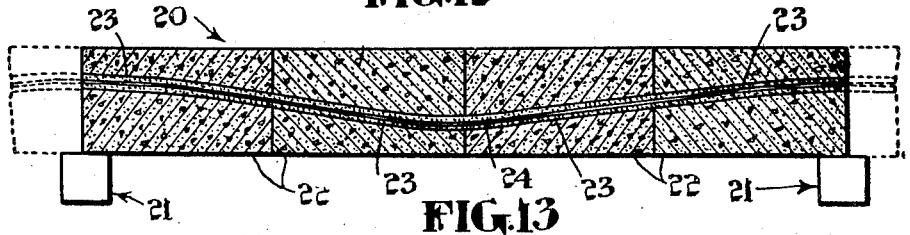
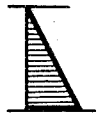
INVENTOR
E. P. MUNTZ
BY Fetherstonhaugh & Co.
ATTORNEYS

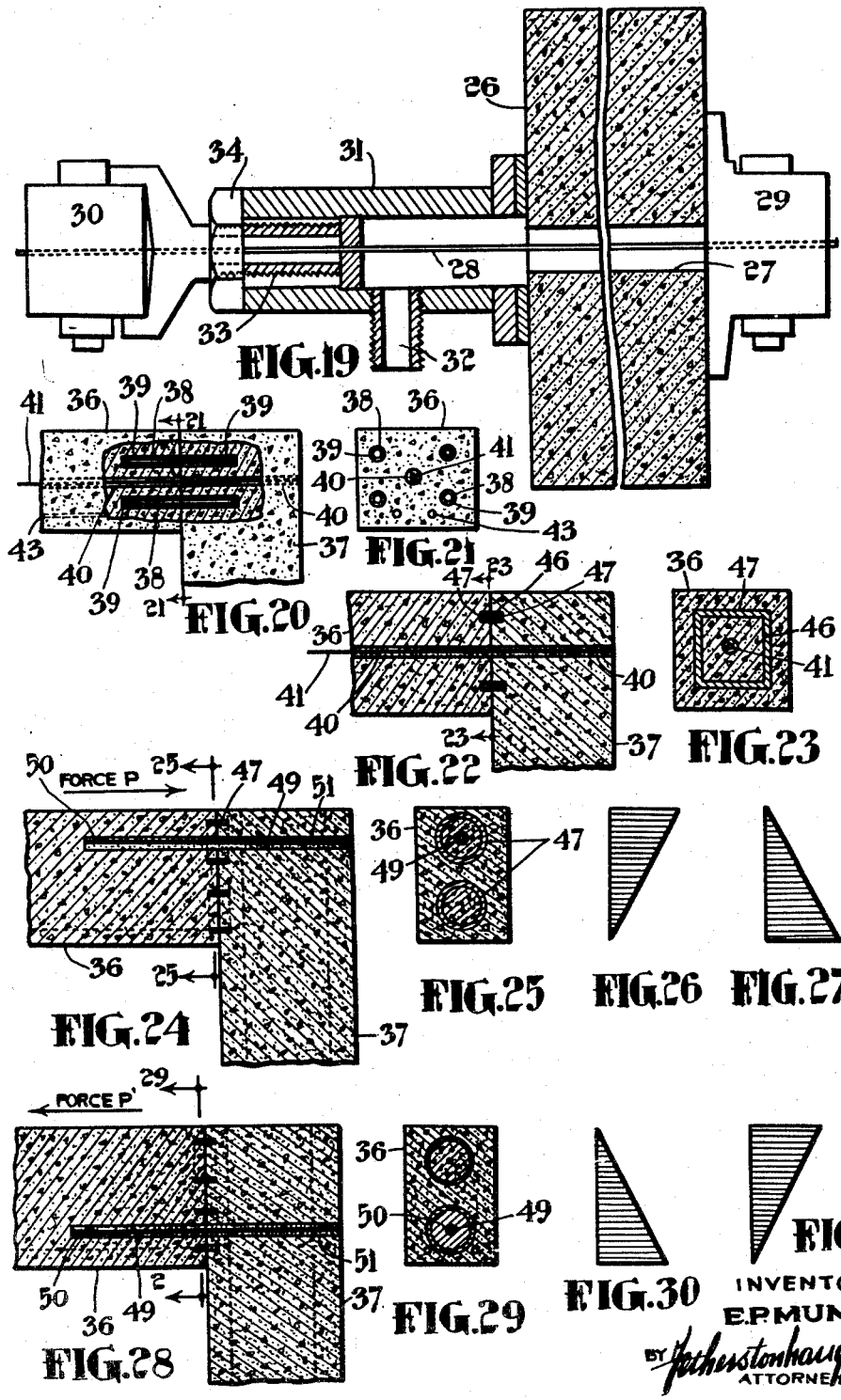

Jan. 7, 1947.  E. P. MUNTZ  2,413,990
PROCESS OF MAKING PRESTRESSED REINFORCED CONCRETE
Filed Jan. 25, 1943  7 Sheets-Sheet 3
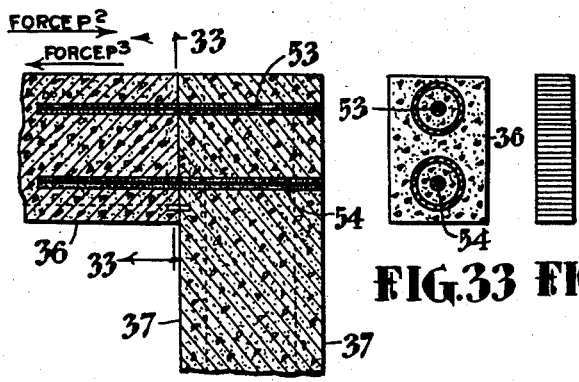
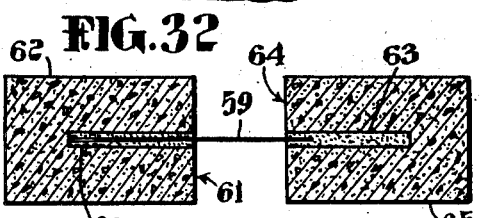
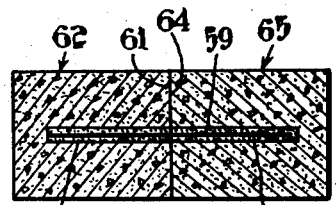
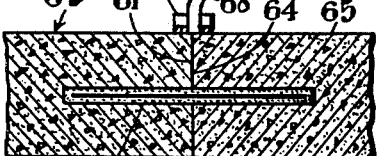
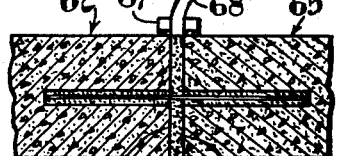
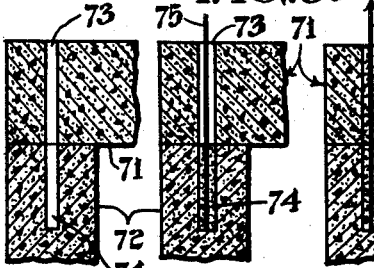
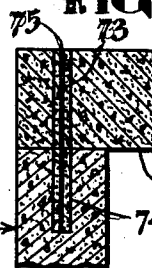
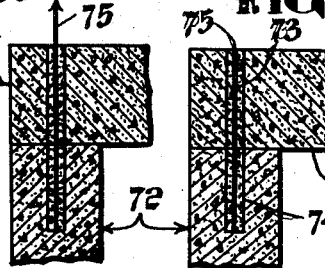
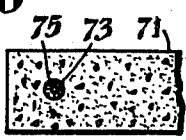
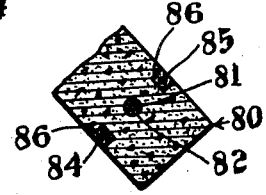
INVENTOR
E. P. MUNTZ
by Fetherstonhaugh & Co.
ATTORNEYS Jan. 7, 1947. E. P. MUNTZ 2,413,990
PROCESS OF MAKING PRESTRESSED REINFORCED CONCRETE
Filed Jan. 25, 1943 7 Sheets-Sheet 5
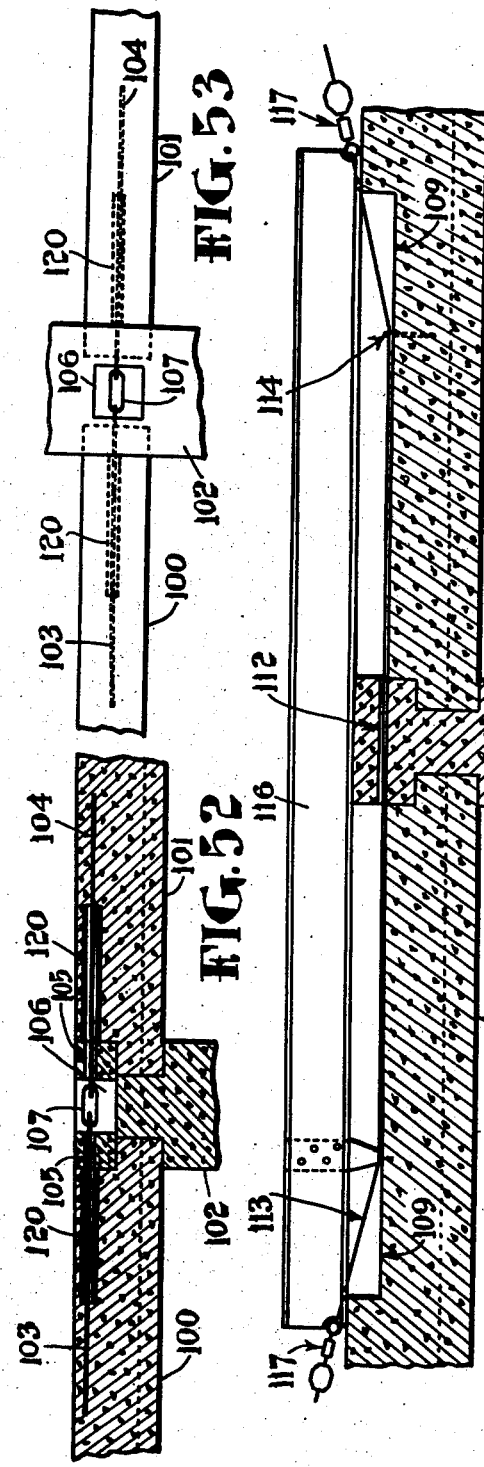
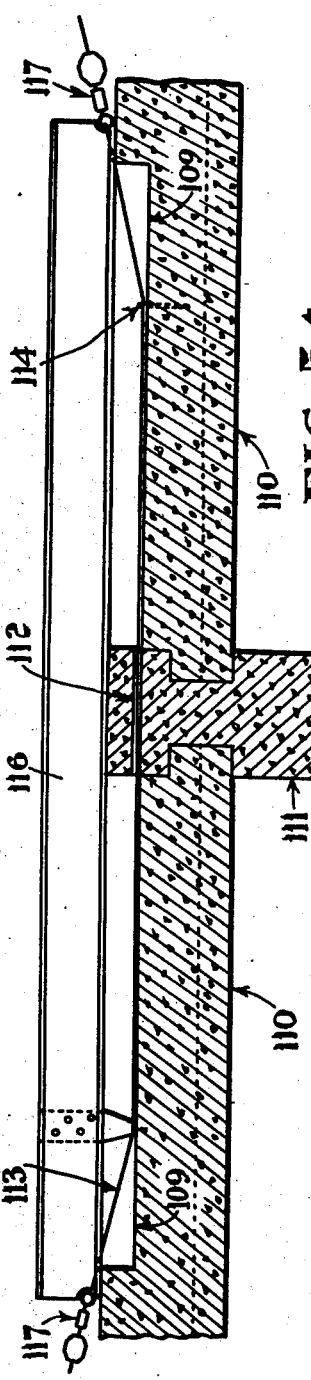
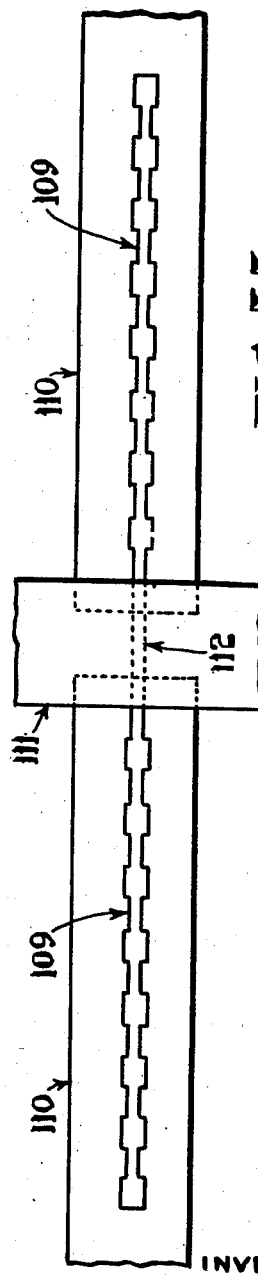
INVENTOR
E. P. MUNTZ
by Fetherstonhaugh & Co.
ATTORNEYS

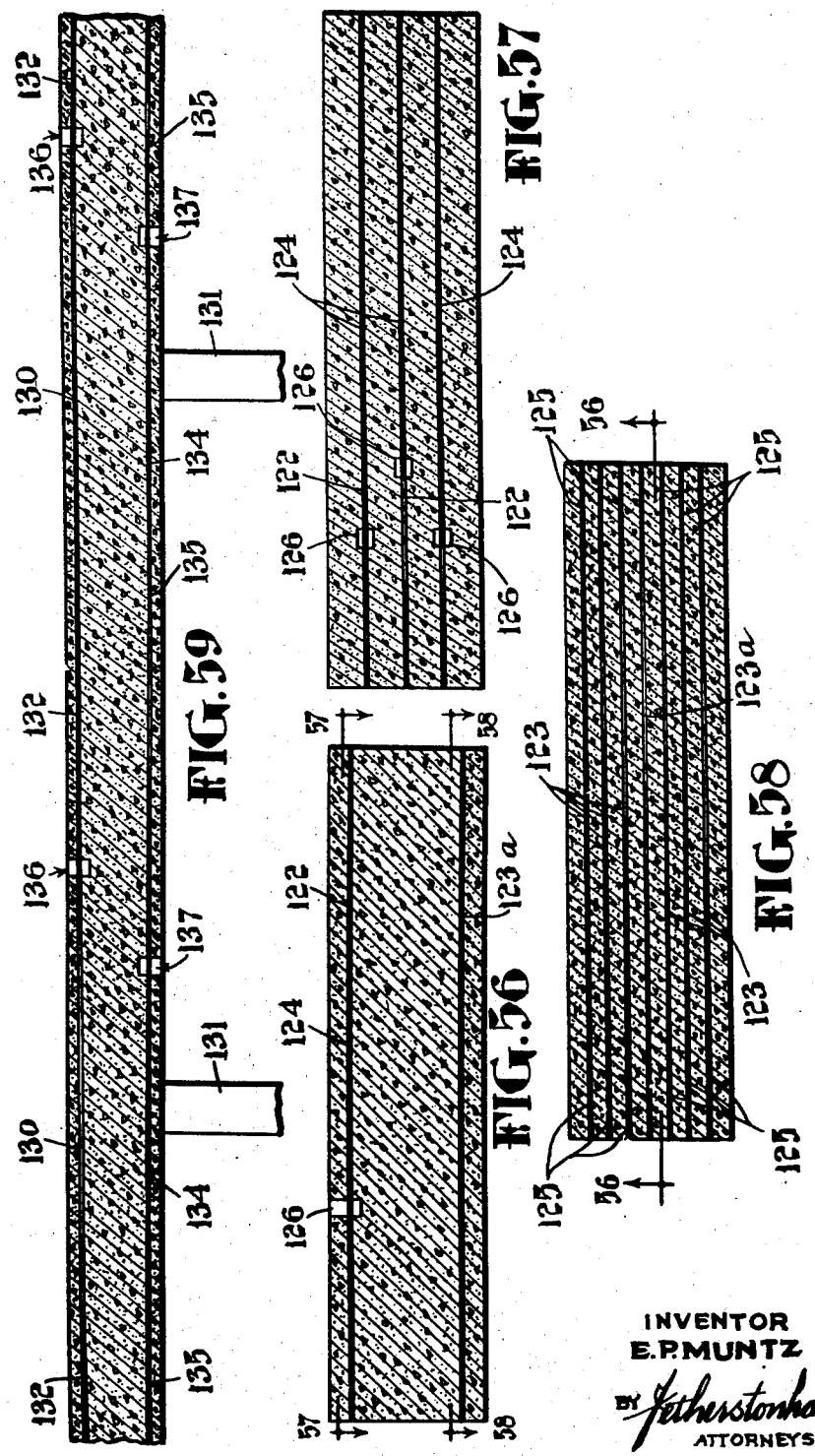

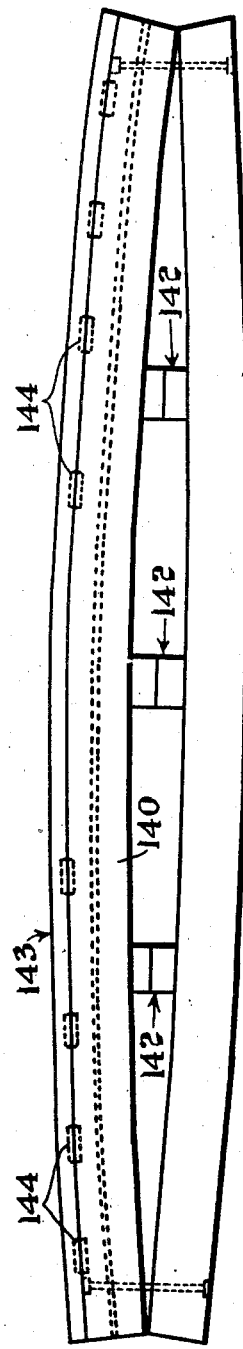
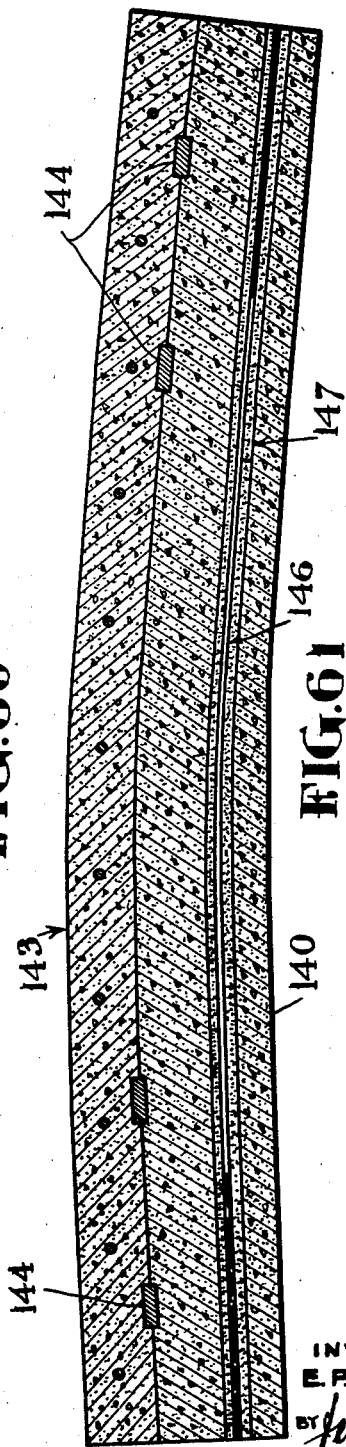

Patented Jan. 7, 1947

2,413,990

UNITED STATES PATENT OFFICE 2,413,990

PROCESS OF MAKING PRESTRESSED REINFORCED CONCRETE

Eric P. Muntz, Montreal, Quebec, Canada

Application January 25, 1943, Serial No. 473,575

12 Claims. (Cl. 25—154)

This invention relates to prestressed reinforced concrete.

The general object of this invention is to extend the range of useful application of prestressed concrete in which the pretensioned steel or other reinforcement members are bonded to the concrete. This object is achieved by (1) providing an economical and commercially feasible method whereby the pretensioning of the reinforcement members and the bonding of said members to a concrete element or structure may be conveniently accomplished after said element or structure has been pre-cast or poured-in-place; (2) providing a method of constructing prestressed reinforced concrete elements or structures which lends itself to initial unit stressing of the bonded steel or other bonded pretensioned reinforcement to a much higher proportion of the elastic limit strength and thus permits advantageous use of bonded reinforcement of larger sizes than have heretofore been considered feasible; (3) providing a novel method of utilizing bonded pretensioned steel or other bonded reinforcement members for prestressing and joining together separately formed concrete elements or structures or for prestressing and joining together separately formed component parts of a single concrete element or structure; (4) providing novel methods of incorporating pretensioned steel or other pretensioned reinforcement members in concrete whereby at least one of said reinforcement members is bonded to the concrete only along one or more preselected portions of its total length, the remaining portion or portions of the length of said partly bonded member being left in the concrete in a bond-free condition; (5) providing novel methods of incorporating pretensioned steel or other pretensioned reinforcement members in either a unitary or a sectional concrete structure which enables any desired variation of stress to be obtained at a given section or joint of the structure in a more simple and practical manner than has heretofore been possible; (6) providing novel methods whereby separately formed concrete elements or separately formed parts of a single concrete element or structure may be prestressed and bonded together in a simple and practical manner which ensures that the elements or parts thus joined together will be equally prestressed at their bonded surfaces and will act together as an integral unitary structure when subjected to bending stresses under the action of their own dead weight and of the superload; and (7) providing novel methods of incorporating pretensioned reinforcement members in a concrete element or structure so that the stressing of the concrete by the reinforcement may be subsequently relieved at one or more preselected points where such stressing is either unnecessary or undesirable and without affecting the stressing of the concrete by the reinforcement at other points where such stressing is required to oppose the stressing of the concrete by the action of its own dead weight or of the superload. According to this feature of the invention a reinforcing member, bonded in place throughout a portion only of its length, will, after release of the initial stressing means, act only throughout its bonded portion. The remaining portions of the length of the member remain in the concrete in a bond-free and inactive condition and are useful only to facilitate the initial placement and stressing of the member. In the case of a reinforcing member bonded in place along several separated portions of its length the cutting of the intermediate unbonded portions of the member after release of the initial stressing thereof and after sufficient bond has been developed between the concrete and the coated portions of the member results in the bonded portions acting in the same manner as if they were initially embodied in the concrete as separate, pretensioned reinforcing members. In other words, the unbonded portions of the reinforcing member serve merely as stress transmitting connections between the bonded portions which enable the latter to be conveniently placed and prestressed prior to being separated from each other.

The foregoing, as well as other objects, advantages and characteristic features of my invention, will be more readily understood from the folowing detailed description of the accompanying drawings, in which—

Figs. 1 to 5 inclusive ilustrate successive steps of one procedure which may be adopted in accordance with my invention for bonding pretensioned reinforcement to preformed concrete elements or structures.

Fig. 6 is a stress diagram illustrating stress characteristics of the completed prestressed, reinforced concrete element appearing in Figs. 4 and 5.

Figs. 7 and 8 are views ilustrating a slight variation of said procedure as applied to the eccentric stressing of a preformed concrete element by pretensioned bonded-in-place reinforcement.

Fig. 9 is a stress diagram illustrating stress characteristics of the eccentrically prestressed, reinforced element appearing in Figs. 7 and 8.

Figs. 10 to 13 inclusive illustrate further variations as regards application of the procedure illustrated in the preceding figures.

Figs. 14 to 18 inclusive are stress diagrams illustrating the stress conditions at the supports and points of inflection of the prestressed, reinforced beam element appearing in Fig. 13.

Fig. 19 is a view, partly in section and partly in elevation, of one form of apparatus which may be employed for tensioning and bonding in place the pretensioned reinforcing element shown in the preceding figures.

Figs. 20 to 25 inclusive illustrate various procedures which may be folowed in accordance with the invention for joining a connecting member, such as a joist, to a supporting member, such as a beam, in such manner as to effect proper prestressing of the joint before the structure is put in service.

Figs. 26 and 27 are stress diagrams illustrating stress characteristics of the joint formed by and between the joist and beam elements appearing in Figs. 24 and 25, Fig. 26 illustrating the stressing of the joint prior to the application of the force P indicated in Fig. 24 and Fig. 27 illustrating the stressing of the joint when said force is acting.

Figs. 28 and 29 are views illustrating a slight modification of the procedure illustrated by Figs. 24 and 25.

Figs. 30 and 31 are stress diagrams illustrating the stressing of the joint in Figs. 28 and 29 before and after the application of the force P' indicated in Fig. 28.

Figs. 32 and 33 are views illustrating a further modification of the procedure illustrated in Figs. 24 and 28.

Figs. 34 to 36 inclusive are stress diagrams illustrating the stressing of the joint in Fig. 32 under varying conditions.

Figs. 37 to 40 inclusive illustrate a procedure whereby an unstressed reinforcing member, which has previously been bonded to abutting portions of two concrete elements, may subsequently be stressed by a slight separation of said elements.

Figs. 41 to 45 inclusive illustrate successive steps of a procedure whereby an end portion of a connecting member, such as a beam may be bonded to an underlying supporting member such as a column by bonding pretensioned reinforcement in place within preformed holes provided in said members.

Figs. 46 and 47 are further views showing how the procedure illustrated in Figs. 41 to 45 inclusive may be applied.

Figure 48:
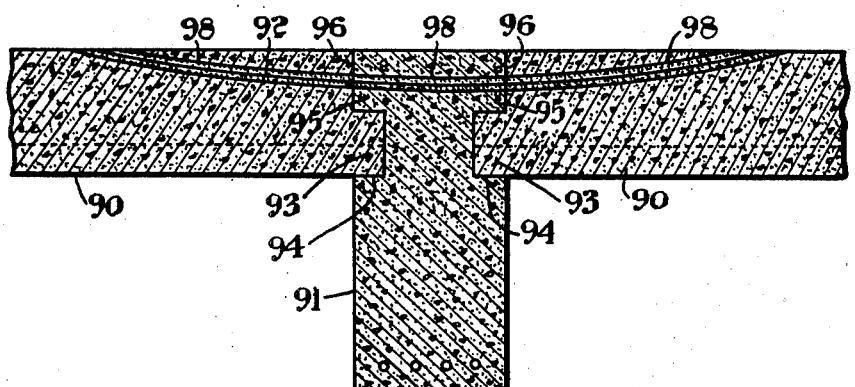
Figure 49:
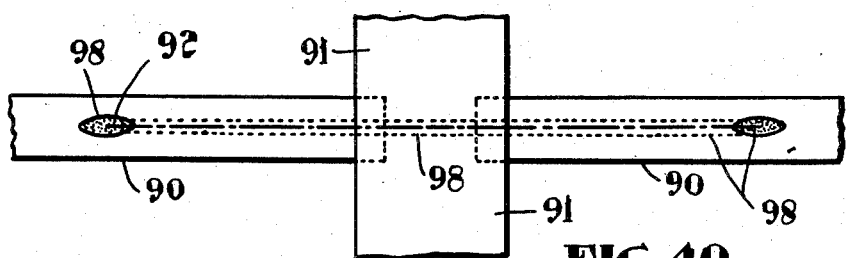

Figs. 48 and 49 are views illustrating one procedure whereby the joint formed by and between a precast or poured-in-place beam and two precast or poured-in-place joists located at opposite sides of the beam may be prestressed by bonding pretensioned reinforcement in place within preformed holes provided for this purpose.

Figs. 50 to 55 inclusive illustrate various modifications of the procedure illustrated by Figs. 48 and 49.

Figs. 56 to 58 inclusive illustrate a procedure whereby a simple concrete beam may be prestressed as required by pretensioned reinforcement which is partly bonded and partly bond-free. These figures also show the beam recessed at appropriate preselected points to provide for cutting of bond-free sections of the reinforcement.

Fig. 59 illustrates a procedure whereby the reinforcing principles illustrated by Figs. 56 to 58 inclusive may be applied to continuous beams.

Fig. 60 is a view illustrating a procedure whereby two members may be bonded together so that they will work together at the joint in the same manner as if they were initially cast in one piece.

Fig. 61 is a view illustrating a modified application of the principles of the procedure disclosed in Fig. 60.

Figs. 1 to 6 inclusive illustrate a simple application of the invention in connection with the bonding of pretensioned steel or other reinforcement to a single performed concrete element. In this case a single concrete element 5 (Fig. 1) is provided with a full length hole 6 extending along the central or gravity axis thereof. The hole 6 may be formed in member 5 during manufacture of said member or by a subsequent hole-forming operation. A steel or other tensionable reinforcement member 7 (Fig. 2) is passed loosely through hole 6 and is then stretched and tensioned by suitable stretching means such, for example, as the hereinafter described stretching means shown in Fig. 19. Then, while member 7 is still maintained in a stretched and tensioned condition, the hole 6 is filled, under pressure, with grout, mortar or other suitable bonding substance 8 (Fig. 3) capable of providing a strong stress-transmitting bond between the reinforcement member 7 and the surrounding concrete. When a satisfactory bond has been developed by the bonding substance 8 the member 7 is released from the stretching means and may be cut off flush with the ends of element 5 as shown in Fig. 4.

The procedure described in connection with Figs. 1 to 6 inclusive provides a simple, practical and economical method for (1) incorporating bonded pretensioned steel or other bonded pretensioned reinforcement in a concrete element which has been precast or poured in place without reinforcement; (2) incorporating additional bonded pretensioned reinforcement in any desired portion of a preformed concrete element or structure in which either passave or pretensioned reinforcement has previously been incorporated during the fabrication of such element or structure. This procedure also has the important advantage of eliminating the use of the costly and cumbersome end anchorages which are required in the case where a preformed concrete element or structure is prestressed by the addition of pretensioned bond-free reinforcement.

The location or eccentricity of the hole 6 in which the pretensioned reinforcement member 7 is bonded in place is a variable factor and may be preselected to give any desired variation of stress at a given section of the element 5. This point will be readily understood by comparing the location of the reinforcement 7 in the element 5 shown in Figs. 1 to 5 with the eccentric location of the reinforcement member 7a of the element 5a shown in Figs. 7 and 8 and noting the different stress characteristics of the two elements as illustrated by their respective stress diagrams (Figs. 6 and 9). Thus, the procedure described herein may be conveniently applied to any precast or preformed poured-in-place concrete element to impart thereto preliminary stressing designed so as to act in opposition to the stress produced by the action of the dead weight of the element and of the superload.

Figs. 10 and 11 illustrate a further embodiment of the invention in which two pretensioned reinforcing members 9 and 10 are bonded to a single concrete element 11, the member 9 being bonded in place within a full length hole 12 extending along the central or gravity axis of the element and the member 10 being bonded in place within a full length groove 13 extending along the upper surface of the element. In this case the members 9 and 10 are pretensioned and bonded in place by the method described in connection with the construction of the prestressed reinforced concrete elements shown in Figs. 4 and 7.

Fig. 12 illustrates a further embodiment of the invention in which a prestressed reinforcement member 14 is bonded in place within corresponding holes 15 provided in a series of preformed concrete elements 16 which have previously been arranged in abutting relation to provide a sectional beam, slab, or other structure. In this case the member 14 is passed through all the holes 15, then stretched and then bonded in place by a filling 17 of grout, mortar or other suitable bonding substance which is forced into the holes under pressure. In Fig. 12 the holes 15 and reinforcement member 14 are shown located on the central or gravity axis of the sectional concrete element but it will be understood that eccentric prestressing of said element may be obtained by eccentric location of the holes 15 or by providing additional holes of any desired eccentricity in which additional prestressed reinforcement members are bonded in place to give any variation of stress desired at the various joints formed by and between the abutting faces of the concrete sections, or at any intermediate cross section.

Fig. 13 shows a sectional prestressed reinforced concrete beam 20 spanning two supports 21, the component beam section 22 being provided with shaped registering openings 23 which conjointly provide a full length sinuous hole in which a sinuous reinforcement member 24 is tensioned and then bonded in place by the previously described method. The sinuosity of the full length hole in which the reinforcement member 21 is bonded in place is predetermined to provide the correct preliminary stress conditions at the joints and other points along the length of the beam. In the case of the beam shown in Fig. 13 the stress conditions at the joints and points of support are substantially as illustrated by the stress diagrams shown in Figs. 14 to 18 inclusive.

Fig. 19 illustrates one form of apparatus whereby the tensioning and bonding-in-place of the reinforcement members shown in the preceding figures may be accomplished in a simple and convenient manner. In Fig. 19, 26 represents either a unitary or sectional concrete element or structure provided with a preformed hole 27 through which a reinforcement member 28 is passed. The reinforcement member is stretched between two relatively adjustable clamps indicated at 29 and 30. Clamp 29 bears directly against one side of the concrete structure 26. Clamp 30 is carried by a hollow fitting 31 which bears against the opposite side of the concrete structure 26 and is provided with an inlet 32 through which the grout, mortar, or other bonding substance is forced through said fitting and into the hole 27. The clamp 30 is provided with a shank or stem 33 which is threaded through an adjusting nut 34 which bears against the outer end of fitting 31. A suitable partition 35 is provided in the fitting 31 to prevent flow of the bonding substance through the outer end of the fitting.

Figs. 20 and 21 illustrate one embodiment of the invention in the case where a connecting member is joined to a supporting member. In these figures 36 represents a concrete beam having one end face butted against a side face of a supporting concrete column 37. A plurality of shear resistors, in the form of metal dowels 38, are bonded in place within preformed registering sockets 39 provided in the meeting faces of the beam and column. The beam and column are also provided with preformed registering holes 40 in which a steel or other pretensioned reinforcement member 41 is bonded in place by the pretensioning and bonding procedure previously described herein. The joist 36 may be provided with additional passive or pretensioned reinforcement 43.

Figs. 22 and 23 illustrate a slight modification of the structural assembly shown in Figs. 20 and 21. In Figs. 22 and 23 the dowels 38 are replaced by a rectangular shear resistor 46 which is bonded or grouted in place within registering recesses 47 provided in the meeting faces of the beam and column.

Figs. 24 to 36 inclusive illustrate further modifications of the structural assembly shown in Figs. 20 and 21.

In Figs. 24 and 25 the beam 36 is joined to the column 37 by a pretensioned reinforcement member 49 which is eccentrically located above the gravity axis of the beam to prestress the joint against the stress imposed by a force P acting in the direction indicated by the arrow in Fig. 24. Fig. 26 illustrates the stress conditions at the joint before the force P acts while Fig. 27 illustrates the stress conditions at the joint when the force P is acting. Figs. 24 and 25 also illustrate a slight modification as regards the pretensioning and bonding-in-place of the joint-bridging reinforcement member 49. In this case a portion of the member 49 is first grouted or bonded in place within a relatively short preformed hole or socket 50. The remaining portion of member 49 is passed through a preformed hole 51 in column 37 and, after being stretched and tensioned, is grouted or bonded in place within said hole 51.

The construction shown in Figs. 28 and 29 is substantially the same as that shown in Figs. 24 and 25, the difference being that, in Figs. 28 and 29, the reinforcement member 49 is eccentrically located a predetermined distance below the gravity axis of beam 36 to prestress the joint against a force P' acting in the direction indicated by the arrow in Fig. 28. The stress conditions existing at the joint in Figure 28, before and after the stressing of the joint by the force P', are respectively illustrated by the stress diagrams (Figs. 30 and 31).

In Figs. 32 and 33 the beam 36 is joined to the column 37 by two pretensioned reinforcement members 53 and 54 which are pretensioned and bonded in place by the procedure described in connection with the single reinforcement member 49 shown in Fig. 24. The reinforcement members 53 and 54 (Fig. 32) are symmetrically arranged above and below the gravity axis of beam 36 to prestress the joint against forces $P^2$ and $P^3$ which act in opposite directions as indicated by the direction arrows in Fig. 32. Fig. 34 illustrates the stress conditions at the joint in Fig. 32 before the joint is subjected to the stressing action of the forces $P^2$ and $P^3$. Fig. 35 illustrates the stress conditions at the joint after the latter has been stressed by the action of force $P^2$. Fig. 36 illustrates the stress conditions at the joint after the latter has been subjected to the stressing action of force P³.

Figs. 37 to 40 inclusive illustrate a further alternative method utilizing pretensioned bonded reinforcement for bonding together and prestressing two preformed concrete elements. In this case a portion of the length of an unstressed reinforcement member 59 is first grouted or bonded in place within a preformed hole 60 (Fig. 37) extending inwardly from one face 61 of a preformed concrete element 62. The remaining portion of the member 59 is then similarly grouted or bonded in place within a preformed hole 63 extending inwardly from one face 64 of a second concrete element 65 so that the said faces 61 and 64 of the two concrete elements are thereby brought into close proximity as shown in Fig. 38. A hollow grouting collar 67 (Fig. 39) is then placed around the joint formed by and between the meeting faces 61 and 64 of the two concrete elements. The grouting collar 67 is provided with a pipe connection 68 through which grout or mortar is forced into the collar and between said meeting faces 61 and 64, thus forcing the concrete elements apart as shown in Fig. 40 and thereby tensioning the reinforcement member 59.

Figs. 41 to 45 illustrate a suitable procedure for joining a beam 71 to an underlying supporting column 72. In this case the supported portion of the beam is provided with a preformed vertical hole 73 (Fig. 41) registering with a similar hole 74 extending downwardly from the upper surface of the column. An unstressed reinforcement member 75 (Fig. 42) is passed downwardly through both of the holes 73 and 74 and is grouted or bonded in place within the hole 74. Member 75 is then stretched and, while maintained in a stretched condition, is grouted or bonded in place within the hole 73 as shown in Fig. 43. Member 75 is then released from the stretching means and cut off flush with the upper surface of the beam as shown in Figs. 44 and 45.

Figs. 46 and 47 illustrate a corner construction in which the corner joint formed by and between the meeting faces of two precast or poured-in-place concrete elements 79 and 80 is properly prestressed by bonding pretensioned joint-bridging reinforcement members in place within preformed holes and grooves provided in said elements. In this case two pretensioned joint-bridging reinforcement members 81 are grouted or bonded in place within preformed holes 82 by the procedure described in connection with Figs. 41 to 45 inclusive. Two additional reinforcement members, 84 and 85, are each grouted or bonded in place within preformed side grooves 86 provided in the elements 79 and 80 as shown more clearly in Fig. 47. The side reinforcement members 84 and 85 may be pretensioned and bonded in place by the procedure previously described in connection with the reinforcement member 10 shown in Fig. 10.

Figs. 48 to 55 inclusive illustrate various procedures which may be followed in joining adjacent ends of two joists or connecting member to an interposed portion of a beam or other supporting member so that the joints between the members may be properly prestressed to resist the action of the dead weight of the joists and of the superload.

In Figs. 48 and 49 the adjacent ends of two preformed joists 90 are shown joined to an interposed portion of a preformed beam 91 by a pretensioned, bonded-in-place joint-bridging reinforcement member 92. In this case end shear resistance is obtained by forming the joists with projections 93 which are received in recesses 94 provided in the beam 91 and by providing the beam with projection portions 95 which are fitted in complementary recesses 96 provided in the joists 90. This method of providing end shear resistance has, of course, the disadvantage that the strength of the members 90 and 91 is substantially reduced by the provision of the relatively large recesses 94 and 96. However, in all cases where the reduction in strength characteristic of this method of providing end shear resistance is a serious matter, resort may be had to the alternate dowel arrangements shown in Figs. 20 to 36 inclusive for resisting end shear without seriously reducing the section and strength of the members which are joined together. The reinforcing member 92 (Figs. 48 and 49) is first passed through preformed aligned holes 98 provided in the beam 91 and in the adjacent end portions of the joists 90 and, after being tensioned, is bonded in place by filling said holes with grout or mortar. After being bonded in place and released from the stretching or tensioning means, the member 92 tends to return to its original length and, in so doing, prestresses the joint formed by and between the concrete members 90 and 91. The members 90 and 91 may be precast or may be poured in place before the pretensioned reinforcement member is bonded thereto.

Figure 50:
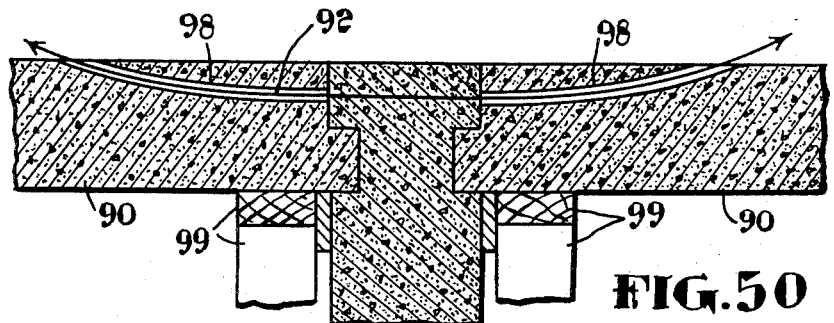
Figure 51:
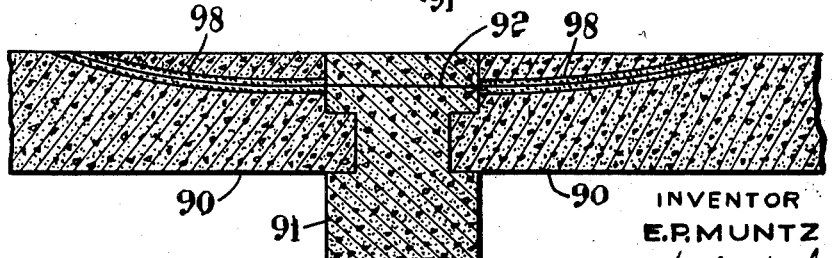

According to the procedure illustrated in Figs. 50 and 51 the adjacent ends of the preformed joists 90 are first supported in their proper relative positions by removable forms or shores 99. The reinforcing member 92 is passed through the preformed holes 98 of the joists 96 and across the gap reserved between the adjacent ends of the joists. The beam 91 is then poured in place so that the portion of the beam which fills the gap between adjacent ends of the joists 90 is thus bonded directly to the gap-bridging portion of the reinforcement member 92. The member 92 is then stretched and bonded to the joists 90 by filling the holes 98 with grout, mortar or other suitable bonding substance. After the last bonding operation the member 92 is released from the stretching means and cut off flush with the upper surfaces of the joists. In some cases the reinforcing member shown in Figs. 50 and 51 may be arranged in place and pretensioned before the beam 91 is poured in place and bonded thereto.

According to the procedure illustrated in Figs. 52 and 53, the adjacent ends of two preformed joists 100 and 101 are assembled in interfitting relation with an interposed portion of a supporting beam 102 so that end shear resistance is provided by the interfitting portions of the joist and beam in the same manner as described in connection with Figs. 48 and 49. In this case the projecting ends of two reinforcing members 103 and 104, which have previously been bonded to the joists, are passed through openings 105 and into a recess 106 provided in the beam 102. The adjacent ends of the reinforcement members 103 and 104 are then coupled together within the recess 106 by a turnbuckle 107 or other tensioning device which is adjusted to stretch and pretension said members. The stretched and tensioned members 103 and 104 are then bonded to the beam 102 by filling the holes 105 and the recess 106 with grout, mortar, or other suitable bonding substance. In the construction shown in Figs. 52 and 53 the beam 102, instead of being precast, may be poured in place provided suitable precautions are taken to provide the recess 106 in which the tensioning of the reinforcement members is effected by means of the turnbuckle 107.

According to the procedure illustrated in Figs. 54 and 55, grooves 109 are provided in the upper surfaces of the adjacent end portions of two preformed joists 110 which are shown supported by an interposed portion of a beam 111, the latter being provided with a preformed hole 112 in line with said grooves. In this case a reinforcement member 113 is passed through the grooves 111 and the hole 13 and is held down in the grooves by one or more hold-down loops 114. The member 113 is then tensioned against the ends of a beam 116 by suitable stretching or tensioning devices 117. The member 113 is then bonded in place while in a stretched or tensioned condition by filling the groves 111 and the hole 112 with mortar, grout or other suitable bonding substance. The member 113 is then cut off at the ends of the bonded portion and the beam 116 is removed. The side walls of the grooves 111 are shown recessed to provide key-connections with the bonding substance but it will be understood that this is an optional and not a necessary feature.

The joint assembly shown in Figs. 54 and 55 can also be arrived at by (a) initially supporting the joists 110 in their proper relative positions by temporary supports; (b) then stretching the reinforcement member 113 along the grooves 109 by means of the beam 116 and stretching devices 117; (c) then pouring the beam 111 in place so that the portion of the beam which is interposed between the joists is bonded directly to the central portion of the reinforcement member 113; and (d) filling the grooves 109 of the joists with the bonding substance.

Another feature of my invention is illustrated by Figs. 52, 53 and 56 to 59 inclusive and consists in prestressing concrete by means of pretensioned reinforcement members which are partly bonded and partly bond-free. This feature of the invention makes it possible to employ pretensioned reinforcement for producing desired stresses at preselected points or sections of a concrete element or structure without producing unwanted stress at other points or sections and may be applied with equal advantage to reinforcement placed and stressed prior to the casting of the concrete element or structure in which it is embodied or to reinforcement which is stretched and bonded to precast or poured-in-place concrete elements or structures. This feature of my invention also makes provision whereby the initial linear stressing of the concrete by the partly bonded and partly bond-free pretensioned reinforcement may be subsequently relieved at one or more preselected points where bond-free portions of the reinforcement are exposed so that they may be readily cut.

In the case of a simple beam provided with full length pretensioned reinforcement members some of said members may be bonded to the concrete throughout their entire length while others may have their end portions or other preselected portions of their length coated or covered by a bond-destroying material. Thus, the combined area of the bonded steel or other bonded reinforcement actually working at any given section in the beam may be made sufficient to withstand the bending moment at that section. The bending moment, of course, varies from zero at the support of a simple beam to a maximum at a location which varies according to the nature of the load to be carried. For simple beams uniformly loaded the maximum bending moment will be at the centre of the span.

In the case of continuous beams or other members where it is desired to develop continuity the location of the bond-free portions of the partly bonded and partly bond-free reinforcement may be preselected to suit the bending moment conditions for the positive moment and also for the negative moment over the supports. In such cases the reinforcement for a positive and negative moment will preferably be in straight lines parallel to the gravity axis of a beam or other member in which the pretensioned reinforcement is embedded when the member is cast. The partly bonded and partly bond-free reinforcement may be continuous for a plurality of beams provided the location of the bond-free portions is correctly predetermined for each beam.

In cases where it may be necessary or desirable to release the tension in one or more bond-free portions of a partly bonded and partly bond-free pretensioned reinforcement member appropriate small recesses may be left in the prestressed concrete to expose the bond-free portions so that they may be cut at any moment between the time the concrete reaches its strength and the time the concrete is put in service. The recesses also make it possible to determine, by visual observation, whether the portion of the reinforcement exposed by said recess, is actually bond-free since, if it is, the ends of the cut wires will separate a measurable amount.

In some cases portions of the pretensioned reinforcement may be surrounded by short sections of pipe which serve as the bond preventing or bond-destroying material. This is exemplified in Figs. 52 and 53, in which the pipe sections 120 serve to prevent bonding of the concrete to the pipe-enclosed portions of the reinforcing elements 103 and 104. In most cases, however, the preselected portions of the pretensioned reinforcement which are to be left in the concrete in a bond-free condition are coated with wax or some other bond-preventing or bond-destroying substance which is capable of withstanding the concrete when the latter is placed around the reinforcement and which will permit the coated portion of the steel or reinforcement to move independently of the surrounding concrete. It may also be pointed out here that the term "bond-destroying" or "bond-preventing" material is intended to include materials which, while initially serving to develop bond between the concrete and pretensioned steel reinforcement members, will melt upon the application of heat, by the application of electrical current, or other heating means and, when so melted, will destroy the bond previously established. In this connection sulphur may be mentioned as a material which will develop bond initially between the concrete and the steel reinforcement but will melt at a heat sufficiently low so as not to temper the steel.

In Figs. 56 to 58 inclusive, I have shown a prestressed beam provided with top reinforcing elements 122 and bottom reinforcing elements 123 all of which are partly bonded and partly bond-free. The beam is also provided with a bottom reinforcing element 123a which is bonded to the concrete throughout its entire length. In the following description each reinforcing element is treated as a single rod or wire but it will be understood that, in practice, each element may consist of a number of steel wires or rods grouped together with sufficient space between them to permit of their being individually bonded to the concrete. Each reinforcement element may also consist of a group of wires or rods arranged in the form of a cable or in any manner that will give the desired bond condition. The bond-free portions of the top reinforcing elements 122 are indicated by the shaded sections 124. The bond-free portions of the bottom reinforcing elements 123 are similarly indicated by the shaded sections 125. In this connection it will be noted that there is considerable variation as regards the length and location of the bond-free sections of the various reinforcing elements. In practice, such variation will be predetermined so that the combined area of the bonded reinforcement actually working at any given section in the beam is sufficient to withstand the bending moment at that section. It will also be noted that, in the case of the beam shown in Figs. 56 to 58 inclusive, the end portions of the top reinforcing elements are bonded while the intermediate portions of said elements are bond-free and that the reverse condition obtains in the case of the bottom reinforcing elements.

The top reinforcing elements 122 are located close to the upper surface of the beam and portions of the bond-free sections of these elements are exposed at appropriate small recesses 126 provided in said surfaces, said recesses occurring at various places calculated according to the stress condition. The recesses 126 are preferably staggered as shown in Fig. 57 in order to minimize the extent to which the strength of the beam is affected by the provision of these recesses.

The advantages of the reinforcing methods illustrated in Figs. 56 to 58 inclusive will be apparent from the following general discussion of prestressed reinforced concrete beams. When the eccentricity of the bottom pretensioned reinforcement from the gravity axis of the beam is small little or no tension is produced in the concrete at the top of the beam by the prestressing action of the bottom reinforcement. As a matter of fact, if the eccentricity of the bottom reinforcement with reference to the gravity axis of the beam is very slight the prestressing action of such reinforcement may even produce a slight compression in the concrete at the top of the beam. In some cases of this nature the use of pretensioned or other reinforcement in the top of the beam may be dispensed with. In most cases, however, some pretensioned top reinforcement is required to overcome the tension which is not eliminated due to bending. As a general rule it is desirable that the eccentricity of the bottom reinforcement with reference to the gravity axis be as large as possible and, in order to offset the resulting tension in the top of the beam, some top reinforcement is required at least until the beam is in place ready for service.

In many instances the stress produced in the concrete of a prestressed beam by the action of the pretensioned reinforcement is not offset by the stress due to the superload when the beam is in service. In the case of a beam provided with top pretensioned reinforcement acting throughout the full length of the beam it is evident that such reinforcement imposes a compression throughout its length which, at the point of maximum moment, increases the stress on the concrete so that the section of the concrete at and adjacent the point of maximum moment must be larger than would otherwise be necessary. Similarly, the use of bottom pretensioned reinforcement acting over its full length imposes a compression on the concrete which is offset at point of maximum moment by change of stress due to bending under the service loads. Since the bending moment for a simple beam reduces to zero at the supports it is evident that, with all the bottom reinforcement acting for the full length of the beam, there is an unnecessary excess of active reinforcement at points in the beam away from the point of maximum moment which makes it necessary to use more concrete than would otherwise be required to withstand the reinforcement at such points.

The foregoing difficulties as regards the uneconomical use of pretensioned reinforcement and concrete in the construction of prestressed reinforced concrete beams and other structures may be eliminated by applying the reinforcing principles illustrated in Figs. 56 to 58 inclusive. When these principles are applied it is possible, by appropriate preselection of the location and extent of the bonded and bond-free sections of each full length reinforcing element, to provide the proper amount of bonded or active pretensioned reinforcement at any given section of the beam without providing excess active or bonded reinforcement at other sections where a less amount of active reinforcement is required. In those cases where it is necessary to eliminate some of the initial stressing of the concrete by the partly bonded and partly bond-free reinforcement elements, this may be conveniently accomplished by cutting one or more of the elements at an appropriate point in the length of a bond-free section which is located between two bonded sections of the same element. The recesses 126 provided for this purpose enable the cutting of the bond-free portion of the reinforcement elements to be conveniently accomplished by means of a wire cutter, cutting torch, or other suitable cutting means. The bond-free sections of the reinforcement elements which are severed by this cutting operation are, of course, lost but the cost is small compared with the use of known methods for controlling the distribution of reinforcement stresses in prestressed reinforced concrete structures.

The reinforcing principles described in connection with the simple beam illustrated in Figs. 56 to 58 inclusive may be applied to the top and bottom pretensioned reinforcement of continuous beams as illustrated in Fig. 59. In this case the bonded sections 130 of the top reinforcing elements are located over the supports 131 while the coated or bond-free sections 132 are appropriately located intermediate said supports. In the case of the bottom reinforcing elements the reverse conditions obtain since the bond-free sections 134 of these elements are located over the supports while the bonded sections 135 are located intermediate the supports. Top and bottom recesses 136 and 137 are provided in the concrete portion of the beam to permit cutting of the bond-free sections of the top and bottom reinforcing elements at appropriate preselected points where it is desirable or necessary to eliminate some of the pretensioned reinforcement stresses before the beam is put in service.

Figs. 56 to 59 inclusive exemplify prestressed reinforced beams which are made by casting the concrete around the coated and uncoated sections of the reinforcing elements while the latter are maintained in a stretched and tensioned condition by any suitable stretching means from which the reinforcement members are released after a satisfactory stress transmitting bond has been developed between the concrete and the uncoated sections of the reinforcing members. However, it will also be understood that reinforcing members of the partly bonded and partly bond-free type shown in Figs. 56 to 59 inclusive may also be embodied in preformed, precast, or poured-in-place concrete elements or structures by the grouting or bonding method described in connection with Figs. 1 to 23 inclusive. In the latter instance the grout or mortar introduced into the preformed holes or grooves in which the partly coated reinforcing elements are inserted will establish a stress transmitting bond between the concrete and the uncoated sections of the reinforcing elements while leaving the coated sections of the reinforcing elements in a bond-free condition; that is to say, free to move relatively to the surrounding grout or mortar.

It will be noted that all of the structures previously described herein are essentially pre-stressed, reinforced concrete structures in which the reinforcement is of the bonded type, notwithstanding the fact that, in certain cases, sections of the length of the reinforcement element are left in the concrete in either a tensioned or an untensioned bond-free condition. The importance of this bonded, or at least partly bonded condition of the reinforcement, will be apparent from the following discussion of the relative merits of bonded and bond-free steel reinforcement used in prestressed, reinforced concrete. With bond-free steel for members in bending the steel stress is the same at point of maximum moment as for bonded steel. However, with bonded steel the change in steel stress due to bending after the stressed reinforcement is in equilibrium against the member equals the change in concrete stress due to bending multiplied by the ratio of the moduli of elasticity of the steel and concrete. This ratio in reinforced concrete design is known as "$n$" and varies from 7.5 to 15 for conventional concretes.

Due to bending the compressive stress imposed by the stretched and bonded reinforcement may be substantially reduced or even changed to tension. The change in stress may be of the order of 3500 p. s. i. using conventional concrete stresses. This results for "$n$" equals 10 in a steel stress change of 35,000 p. s. i thus if the final working steel stress desired is 120,000 p. s. i the stress in the steel when in equilibrium against the concrete need be only 85,000 p. s. i before the loads are applied.

There is, therefore, a reduction of 29.1% in the stress in the stretched and bonded reinforcement before bending due to the load. This consideration is most important when the stem of T beams and other thin sections are considered. Smaller end sections can be used safely than when the reinforcing is bond-free and anchored at the ends only. There are other desirable features which will be mentioned later.

With bond-free steel the change in steel stress due to bending after the stretched reinforcing is in equilibrium against the member also equals the change in concrete stress due to bending. In this case, however, the change must be considered as the sum of the changes from the point of maximum moment to the point where the stretched wire is anchored. The latter point for simple beams is at the support.

As an example for a simple beam of span "L" with a concentrated load "P" at the centre the bending moment due to the load is ¼ PL. This is at the centre of course and decreases uniformly to zero at the supports. The stress due to the load changes uniformly and therefore the change of stress due to the load will change uniformly also in a beam subjected to prestressing of uniform intensity at any plane parallel to its gravity axis.

Thus the change in concrete stress (or change in length) producing the change in the steel stress is the average or half of the maximum for this condition of loading. If the change in concrete stress due to the load "P" at the point of maximum moment, i. e. at the centre, is 3500 p. s. i., the average is 1750 p. s. i. and the change in steel stress will be 17,500 p. s. i. or half that with bonded steel. Thus if the final working stress is 120,000 p. s. i. the stress in the steel when in equilibrium against the concrete will be 102.500 p. s. i. before the load is applied or a reduction in stress of 14.8%.

The difference between the two is, therefore, 14.3 in favour of the bonded steel.

It also means that the initial stressing of the reinforcement may be much lower than with bond-free steel. Thus if shrinkage and plastic flow account for loss of initial tension of 24,000 p. s. i. and the final stress desired is 120,000 p. s. i, the initial stressing for bond-free steel will be 144,000 p. s. i., less the change of 17,500 p. s. i. due to the change in the concrete stress, leaving 126.500 p. s. i.

With bonded steel the initial stress is 109,000 p. s. i. The steel area is the same. Therefore the capacity of the gear to produce the prestress is substantially less for bonded steel.

There is another very important point. My development makes possible the use of initial unit stressing of the steel to a much higher proportion of the elastic limit strength. Thus larger sizes of reinforcing may be used to an advantage. These larger sizes have commercially a lower strength. As an example consider two sizes of wire.

0.08" dia. (14 ga.) has an area of 0.005 sq. inch. Its ultimate strength is 275,000 p. s. i. Its elastic limit is approximately 240,000 p. s. i. A working strength of 50% of the elastic limit is conservative practice, i. e. 120 000 p. s. i. The initial stressing should not exceed ⅝ of the elastic limit or 150,000 p. s. i. in this case.

With bonded steel assume the loss in steel stress due to shrinkage and plastic flow in the concrete amounts to 24,000 p. s. i., and assume also that the change in the concrete stress due to bending causes a change in steel stress of 14,000 p. s. i. There is still another factor to consider, it is the elastic deformation or shortening of the concrete due to the initial stress in the steel acting on the concrete. If this stress is 1,500 p. s. i., the steel stress loss will be 15,000 p. s. i. for $n=10$. The initial steel stress then must be $(120-14+24+15)K$ or 145,000 p. s. i. This is within ⅝ of the elastic limit.

Now substitute 0.187" dia. wire ($\tfrac{3}{16}$" dia. approximately) the area is 0.0274 sq. inch, i. e. five times the above. The ultimate strength is 225,000 p. s. i. and the elastic limit about 180,000 p. s. i. Therefore the final working stress should not exceed 90,000 p. s. i. and the initial stress 125,000 p. s. i. With the same change of stress conditions as above it is seen at once that the tension in the steel must be $(100-14+24+15)K$ or 125,000 p. s. i.

Now with bond-free steel and assuming the same general conditions together with a condition of central loading for simplicity the change due to bending in the first case will be 7,000 p. s. i., not 14,000 p. s. i., and the initial stress will be 152,000 p. s. i which exceeds 5/8 of the elastic limit In the second case the initial tension will be 132,000 p. s. i. or 7,200 p. s. i. in excess of 5/8 of the elastic limit.

It is of course evident immediately that should the above rules for safe working stress and initial steel stress be raised proportionally until the initial steel stress reaches the elastic limit, the same advantages will accrue to the bonded steel versus the bond-free steel.

The use of larger size reinforcement results in easier handling spacing and location in beam sections where end bond conditions permit.

Figs. 60 and 61 illustrate a further feature of the invention which makes it possible to bond together two separately formed members or two separately formed parts of a single member so that the members or parts of members thus bonded together will be equally stressed at their bonded surfaces and, when subjected to bending stresses under the action of their own dead weight and the superload, will act together as an integral unitary structure. This is accomplished by constructing a poured-in-place prestressed concrete structure on or against an appropriately pretensioned surface of a previously formed structure so that the meeting surfaces of the two structures thus bonded together will be equally tensioned after the setting of the poured-in-place concrete. This ensures that the two structures thus bonded together will, when placed in service, act together in substantially the same manner as if they had initially been cast in one piece.

In the example shown in Fig. 60, a preformed, prestressed, reinforced concrete supporting beam 140 is warped by fastening its ends to the ends of an underlying warping member 141 and interposing warping wedges 142 between suitable intermediate portions of the beam and warping member. This produces, at the upper convex surface of the warped beam, tension stresses which may be predetermined to equal the calculated shrinkage-tensioning in the adjacent bonded surface of a prestressed concrete slab 143 which is poured in place on the upper surface of the beam. As a precautionary measure it is preferable that the joint between the beam and slab be reinforced by suitable shear resisting elements 144. When the setting of the slab is complete the beam-warping elements are removed. When the bonded beam and slab are placed in service their bonded surfaces will be equally stressed by the bending action of the dead weight and of the superload and will thus act together in the desired manner.

In the further example shown in Fig. 60 the beam 140 is warped by the stressing action of eccentrically located pretensioned reinforcement 146 which is grouted in place within preformed holes 147 provided in the beam near its lower surface. The reinforcement 147 is here shown as being of the partly bonded and partly bond-free type, the bond-free sections being shown shaded and located at the ends of the beam.

The principles of the method illustrated by Figs. 60 and 61 may also be used for joining two parts of a single member. As an example it is possible to cast in place or precast part of a beam, deflect or warp the part thus formed in a suitable manner, and then pour the remaining portion of the beam in place upon the previously formed warped or deflected part. It will also be understood that various warping or deflecting methods, other than those illustrated in Figs. 60 and 61 may be employed and that the invention is not limited to the cited examples.

While I have described the principles of my invention and have given numerous examples of possible application of these principles, it will be understood that the invention is not limited in its application to the cited examples and that various modifications may be resorted to within the scope and spirit of the invention as defined by the appended claims. It is also to be understood that the terms "reinforcement" and "reinforcing members" used throughout the specification and claims are intended to cover any and all types of pretensioned reinforcement previously used in the manufacture of prestressed, reinforced concrete as well as all equivalent reinforcement capable of being so used.

I claim:

1. That improvement in the process of making prestressed, reinforced concrete which comprises incorporating a pretensioned, reinforcement member in the concrete so that said member is bonded to the concrete only along one or more preselected portions of the total length of said member, the remaining portion or portions of said member being left embodied in the concrete in a bond-free condition.

2. That improvement in the process of making prestressed, reinforced concrete which comprises incorporating a pretensioned, reinforcement member in the concrete so that said member is bonded to the concrete, only along one or more preselected portions of the total length of said member, the remaining portion or portions of said member being left embodied in the concrete in an accessible bond-free condition and subsequently interrupting the continuity of said member by cutting it at one of the bond-free portions.

3. That improvement in the process of making prestressed, reinforced concrete which comprises applying a bond-destroying covering to one or more preselected portions of a reinforcement member, stretching said member by suitable means, casting concrete around covered and uncovered portions of said member while maintaining the latter in a stretched condition and releasing said member from the stretching means after a sufficiently strong stress-transmitting bond has been developed between the concrete and the uncovered portion or portions of said member.

4. That improvement in the process of making prestressed, reinforced concrete which comprises applying a bond-destroying covering to one or more preselected portions of a tensionable reinforcement member, arranging said member in a preformed hole or groove provided in a precast concrete element or structure, stretching the entire length of said member by suitable means, filling said hole or groove with a bonding substance capable of establishing a stress-transmitting bond between the concrete and the uncovered portion or portions of said member, maintaining said member in a stretched condition during the filling of said hole or groove with said bonding substance and releasing said member from the stretching means subsequently to the development of a sufficiently strong bond between the concrete and the said uncovered portion or portions of the member.

5. That improvement in the manufacture of prestressed, reinforced concrete elements which comprises bonding unstressed reinforcement members to concrete elements with portions of the members projecting beyond said elements, arranging two of said elements at opposite sides of a supporting member and then connecting a projecting reinforcement member of one element to an aligned projecting reinforcement member of the companion element by a coupling which is adjustable to tension said reinforcement members.

6. Prestressed reinforced concrete characterized in that at least one reinforcement member incorporated therein is bonded to the concrete only along one or more preselected tensioned portions of the total length of said member, the remaining portion or portions of the total length of said member being left permanently embedded in the concrete in an untensioned and bond-free condition.

7. That improvement in the process of making prestressed reinforced concrete which comprises incorporating a reinforcement member in the concrete so that said member is tensioned and bonded to the concrete only along one or more preselected portions of the total length of said member, the remaining portion or portions of said member being left embodied in the concrete in an untensioned and bond-free condition.

8. That improvement in the process of making prestressed reinforced concrete which comprises coating one or more preselected portions of a reinforcement member with a bond-destroying material, stretching said member by suitable means and casting concrete around coated and uncoated portions of said member while maintaining the latter in a stretched condition so that a stress transmitting bond is developed between the concrete and the uncoated portion or portions of said member but not between the concrete and the coated portion or portions of said member.

9. That improvement in the process of making prestressed reinforced concrete which comprises coating one or more preselected portions of a reinforcement member with a bond-destroying material, stretching said member by suitable means, casting concrete around coated and uncoated portions of said member while maintaining the latter in the stretched condition so that a stress transmitting bond is developed between the concrete and the uncoated portion or portions of said member but not between the concrete and the coated portion or portions of said member and releasing said member from the stretching means after a sufficiently strong stress transmitting bond has been developed between the concrete and the uncoated portion or portions of said member.

10. That improvement in the process of making prestressed reinforced concrete which comprises coating one or more preselected portions of a tensionable reinforcement member with a bond-destroying material, arranging said member in a preformed hole or groove provided in a precast concrete element or structure, stretching said member by suitable means, filling the entire length of said hole or groove with a bonding substance capable of establishing a stress transmitting bond between the concrete and the uncoated portion or portions of said member, maintaining said member in a stretched condition during the filling of said hole or groove with said bonding substance and releasing said member from the stretching means subsequently to the development of a sufficiently strong bond between the concrete and the said uncoated portion or portions of the member, the coated portion or portions of said member being left embedded in the bonding substance in a bond-free condition.

11. That improvement in the process of making prestressed reinforced concrete which comprises applying a permanent bond-destroying covering to one or more preselected portions of a reinforcement member to permanently prevent bonding of the covered portion of said member to the concrete in its initial incorporation, casting concrete around covered and uncovered portions of said member and then securing said member, under tension, to another concrete structure against which the concrete in which said member is initially embedded is butted.

12. That improvement in the process of making and joining prestressed reinforced concrete elements which comprises applying a permanent bond-destroying covering to one or more preselected portions of a reinforcement member, casting concrete around covered and uncovered portions of said member to form a reinforced concrete element from which an end of said member projects, the portion of said member immediately adjacent the projecting end being a covered bond-free portion of said member, passing said projecting end portion of said reinforcement member through a preformed hole or groove in a second concrete element against which the first mentioned element is butted, stretching said member by suitable means and, while maintaining said member in a stretched condition, filling said preformed hole or groove with a bonding substance capable of developing a strong stress transmitting bond between the stretched reinforcement member and said second element.

ERIC P. MUNTZ.